Oct. 26, 1965 W. A. REYNOLDS 3,213,487

BIRD TYING MACHINE

Original Filed June 20, 1961 5 Sheets-Sheet 1

INVENTOR.
William A. Reynolds
BY
Hovey, Schmidt, Johnson & Hovey
ATTORNEYS.

Oct. 26, 1965 W. A. REYNOLDS 3,213,487
BIRD TYING MACHINE
Original Filed June 20, 1961 5 Sheets-Sheet 2
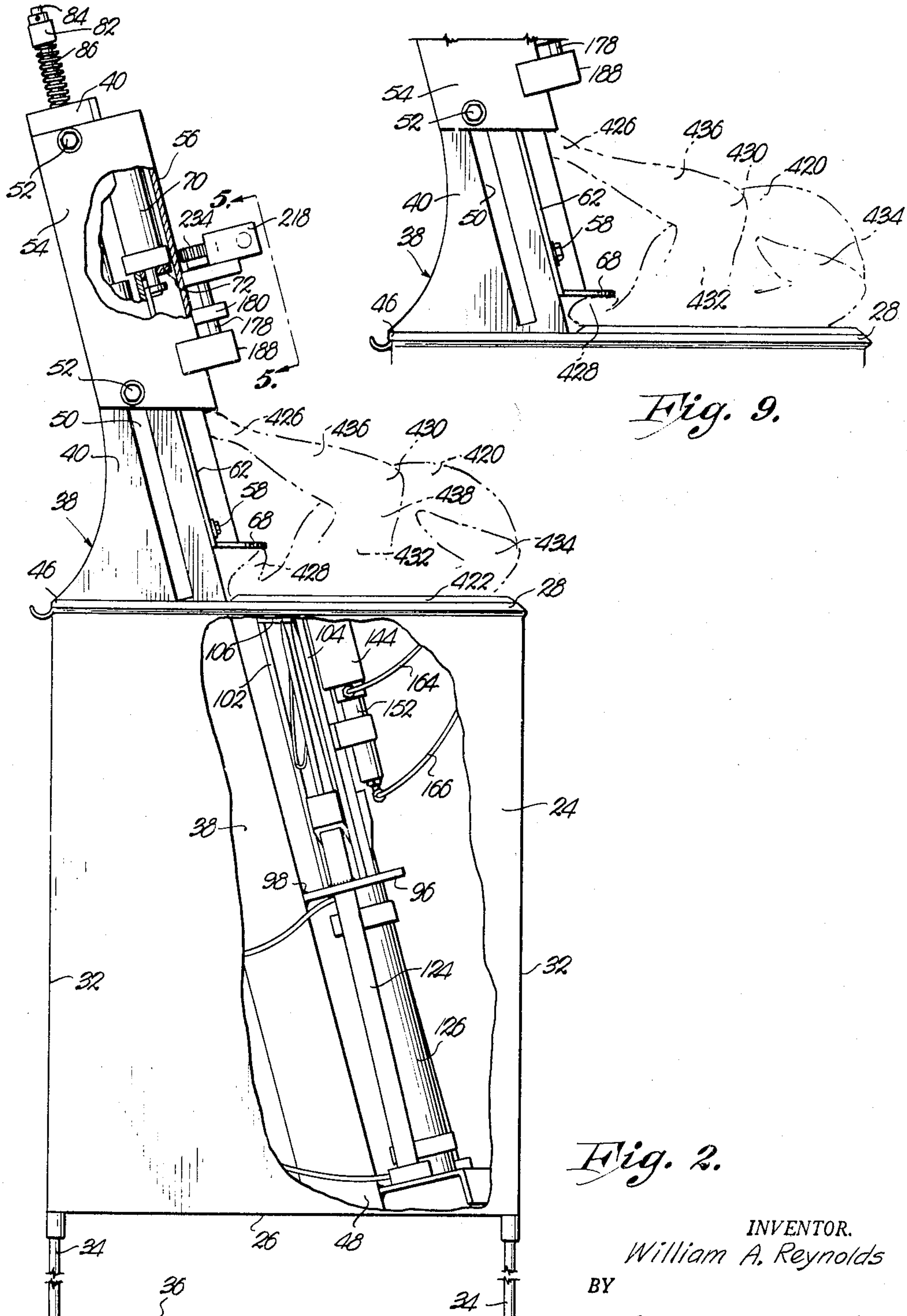
INVENTOR.
William A. Reynolds
BY
Hovey, Schmidt, Johnson & Hovey
ATTORNEYS.

Oct. 26, 1965 W. A. REYNOLDS 3,213,487

BIRD TYING MACHINE

Original Filed June 20, 1961 5 Sheets-Sheet 3

INVENTOR.
William A. Reynolds
BY
Hovey, Schmidt, Johnson & Hovey
ATTORNEYS.

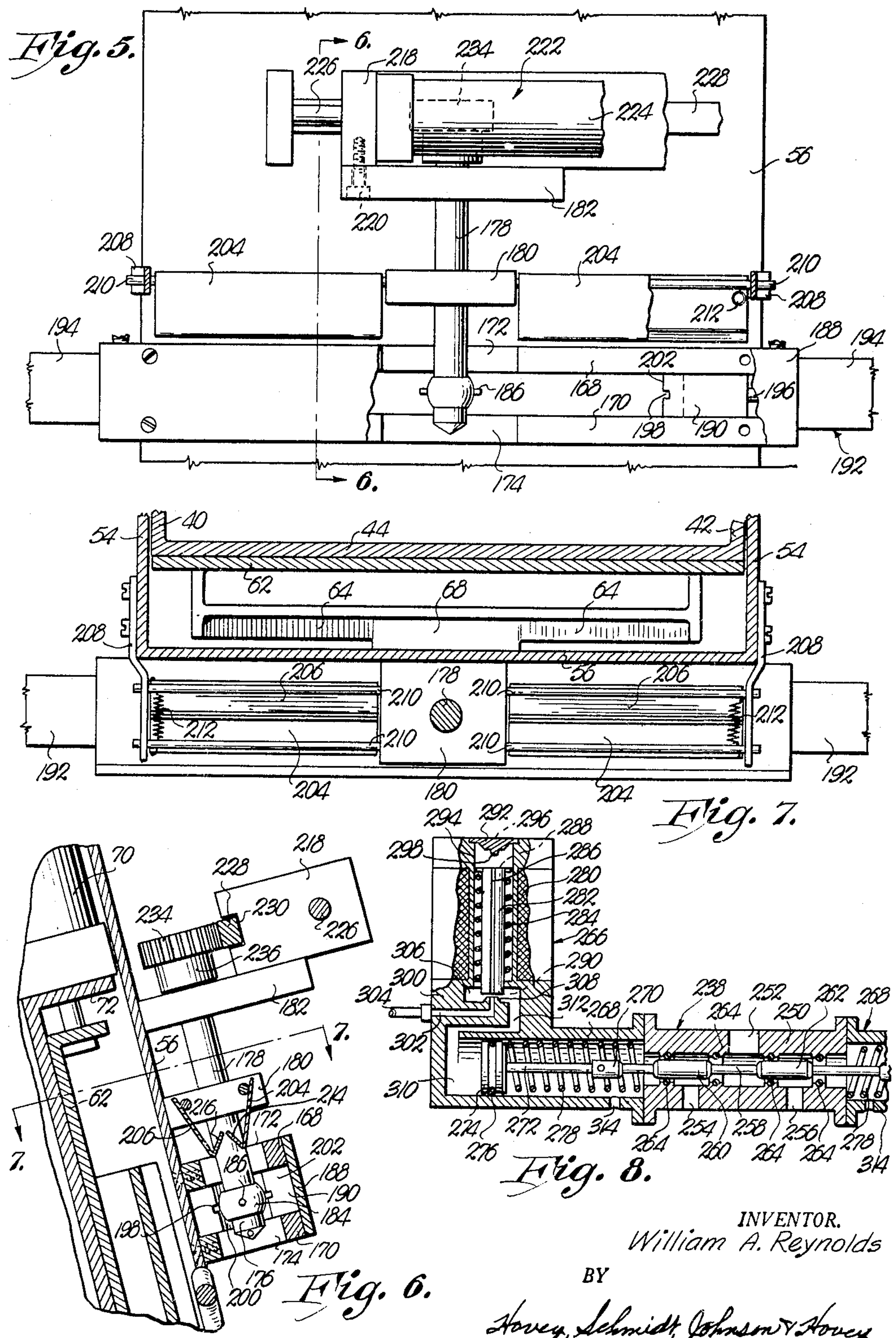
INVENTOR.
William A. Reynolds
BY
Hovey, Schmidt, Johnson & Hovey
ATTORNEYS.

Oct. 26, 1965 W. A. REYNOLDS 3,213,487
BIRD TYING MACHINE
Original Filed June 20, 1961 5 Sheets-Sheet 5
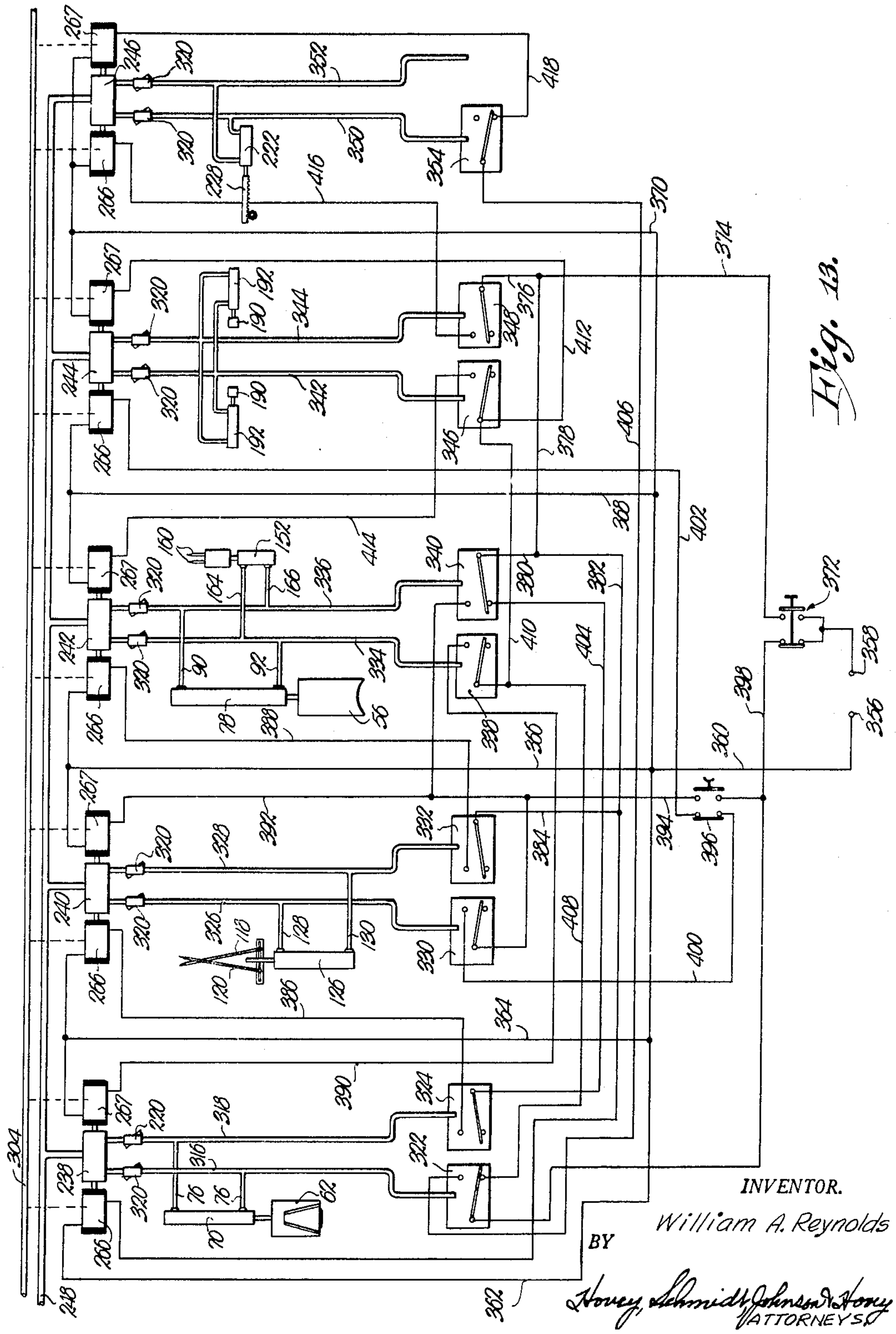
INVENTOR.
William A. Reynolds
BY
Hovey, Schmidt, Johnson & Hovey
ATTORNEYS.

United States Patent Office 3,213,487 Patented Oct. 26, 1965

3,213,487

BIRD TYING MACHINE

William A. Reynolds, Prairie Village, Kans., assignor to Gordon Johnson Company, Kansas City, Mo., a corporation of Missouri Original application June 20, 1961, Ser. No. 118,335. Divided and this application Dec. 26, 1962, Ser. No. 247,177
10 Claims. (Cl. 17—11)

This is a division of my copending application Serial No. 118,335, filed June 20, 1961, and entitled Method of Handling Carcasses.

This invention relates to a machine for securing the shiftable parts of an eviscerated bird to the body thereof, and more particularly, to a machine for binding the legs of the bird to or over the tail thereof by means of an elongated wire.

It has come to the attention of the poultry processing industry that a machine for tying the legs of an eviscerated bird to the body thereof, preferably the tail of the bird, has been needed for some time owing to the fact that the birds are more suitably disposed for subsequent freezing and packaging when the legs are trussed with the respective bodies. Attempts have been made to manually tie the birds so as to dispose the same in a suitable condition for packaging, but of course, this method has certain disadvantages, especially since a considerable amount of time and effort are required to manually force the legs to positions wherein a tying member may be manually wound around the legs and body of a bird so as to bind the legs to the body. In addition, considerably more time and effort are expended in securing the ends of the tying member together, especially while attempting to restrain the movement of the legs from the aforesaid positions.

The present invention satisfies this need for such a machine, and to this end the machine accomplises the tying of the legs of a bird to or over the tail thereof automatically in a minimum of time and with a minimum of operator supervision so as to considerably reduce the time required to accomplish the tying operation and thereby reducing the labor expended therefor.

To this end, the present invention provides a machine having means thereon for holding the bird in a fixed position while the legs are moved into a hunched or squatted relationship to the body of a bird so that a wire may be looped through the body and around the tail and legs of the bird while the legs are hunched. Means are further provided for twisting the ends of the wire so as to bind the legs to the tail, whereupon the twisted ends of the wire may be folded down over the bird so that the bird is in condition for the packaging and freezing operations thereof.

It is, therefore, the primary object of the present invention to provide a machine which automatically shifts the out-stretched legs of a carcass into proximal disposition and then wraps an elongated securing member around the legs when the same are in a hunched position relative to the body thereof, whereby the carcass is placed in condition for subsequent packaging and freezing thereof and thus the time required to place the carcass in this condition is materially reduced over conventional trussing methods.

Another object of the present invention is the provision of a machine for moving the upwardly and rearwardly extended legs of a carcass such as an eviscerated bird, downwardly and forwardly to a position against the body thereof, whereby the legs are in a hunched position relative to the body and in position to be bound to the latter by a securing member looped around the legs and twisted so as to tie the legs of the bird to the tail thereof.

A further object of the invention is to provide a machine for shifting legs of poultry into disposition adjacent the tail of the bird and including structure capable of securing the hunched legs of the bird to the tail thereof with a suitable length of wire or the like, so that the bird is ready for subsequent freezing or packaging.

Still another object of the present invention is the provision of means for clamping the tail of the bird for maintaining the latter in a fixed position while the legs are moved toward said body whereby the bird remains stationary as the wire is subsequently inserted through the back and around the legs to thereby assure a positive and complete binding of the legs to the tail.

Another object of the present invention is the provision of probe means which are insertable within the bird in spaced relationship to the tail thereof so that lateral movement of the bird is precluded while the wire is looped through the back and around the legs and tail to thereby assure proper trussing of the bird.

A further object of the present invention is the provision of a pair of elongated needles which are adapted to pass through the bird in the vicinity of the tail thereof and around the legs before the latter have been moved to a position adjacent the tail, whereby the wire for tying the legs to the tail may be carried by the needles to a position with the wire looped around the legs and tail.

Another object of the present invention is the provision of an abutment having an inclined surface over which the upwardly and rearwardly extended legs of an eviscerated bird slide as the same move downwardly so that the legs may be moved forwardly simultaneously with the downward movement thereof to thereby move the legs to a hunched position adjacent the body of the bird.

Also an important object of the invention is the provision of novel securing means for connecting the hunched legs of the bird to the body thereof and comprising an initially U-shaped wire having preshaped, oppositely extending eyelets at opposed extremities thereof for facilitating inserting of the wire through the back and around the legs of the bird through utilization of automatic equipment having needles positioned to receive respective eyelets of the wire and thereby move the ends of the wire through the rear portion of the bird where the end of the wire may then be suitably twisted to effect securing of the legs of the bird to the tail thereof.

Other objects of the present invention relate to the provision of pneumatically-actuated power devices for shifting the legs of the bird to a position adjacent the tail thereof and for advancing the wire in looped engagement through the body and around the legs and tail, whereby the ends of the wire may be subsequently twisted to secure the legs to the tail; to the provision of pneumatically-actuated, electrically-conducting switch means which are sequentially operable by the provision of valve means interposed in the pneumatic circuit whereby the operation of the machine is systematic with the twisting of the ends of the wires following the shifting of the legs downwardly, the engagement of the probes with the bird, and the shifting of the needles to a position with the wire in a looped condition around the legs and tail of the bird; to the provision of a rotatable shaft for engaging the ends of the wire, whereby the ends of the wire are twisted as the shaft rotates; to the provision of a rack and pinion apparatus for rotating the shaft whereby the ends of the wire are twisted; and to the provision of electrically-conducting solenoid means for actuating the valves controlling the flow of fluid to the various power sources, whereby the operation of the machine may be rendered automatic responsive to the pneumatic operation of the electrically-conducting switch means.

Other objects of the present invention will become apparent as the following specification progresses, reference being had to the accompanying drawings, wherein:

FIG. 2 is a side elevational view of the machine illustrated in FIG. 1 and showing in dashed lines, an eviscerated bird mounted thereon in an operative position;

FIG. 5 is an enlarged, front elevational view of the wire-twisting means taken along line 5—5 of FIG. 2, parts being broken away to illustrate details of construction;

FIG. 6 is a cross-sectional view taken along line 6—6 of FIG. 5;

FIG. 7 is a cross-sectional view taken along line 7—7 of FIG. 6;

FIG. 8 is a cross-sectional view of a valve for controlling the flow of fluid to one of the power-actuated devices and illustrating the solenoid control valve for actuating the same;

FIG. 9 is an end elevational view of a portion of the machine and illustrating the tail-engaging portion of the machine and illustrating the tail-engaging portion of the machine for clamping the tail thereto in an operative position, the bird being shown in dashed lines;

FIG. 13 is a schematic wiring diagram illustrating the electrical interconnection between the pressure-actuated switches and the solenoid-controlled air valves for directing air to the power-actuated devices for operating the machine.

Figures 1, 11:
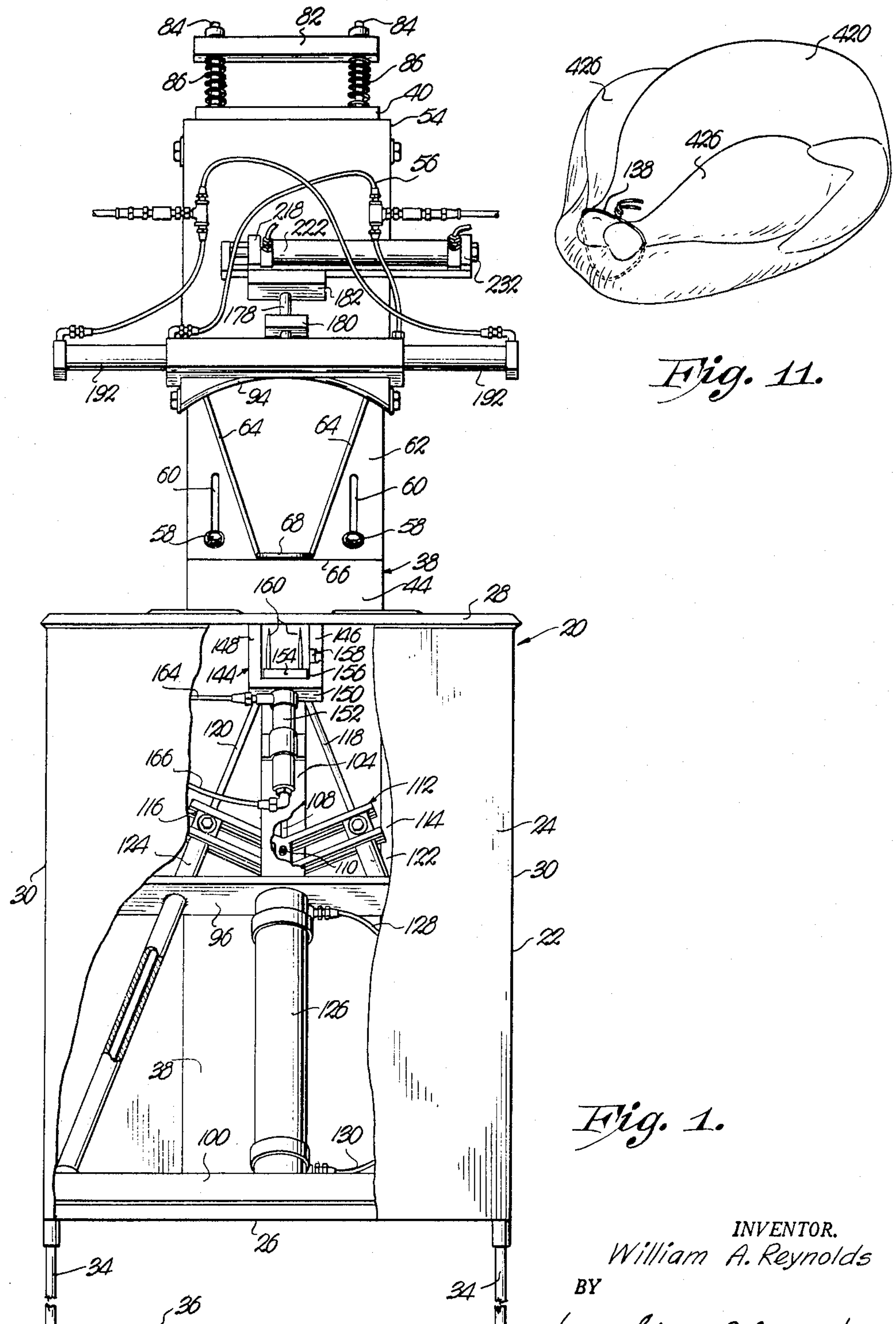
FIGURE 1 is a front elevational view of the machine which forms the subject of the present invention, parts being broken away to illustrate details of construction.
FIG. 11 is a perspective view of a bird with the legs thereof tied to the tail and in a condition for packaging or freezing.
Figure 4:
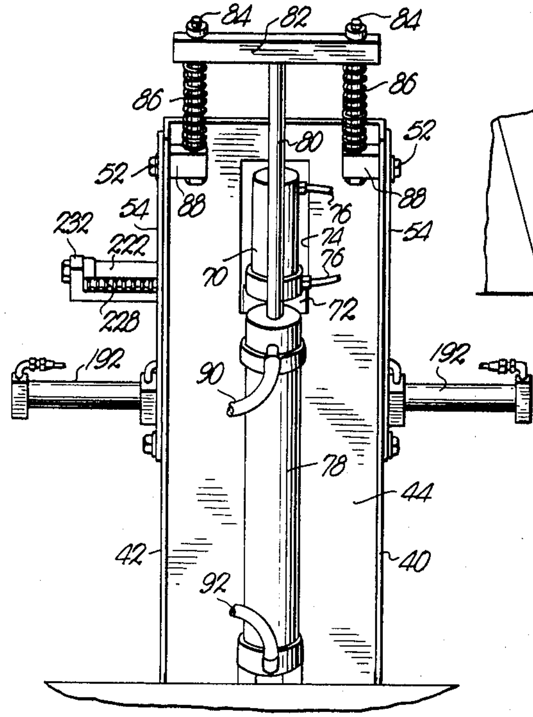
FIG. 4 is an enlarged, rear elevational view of the upper portion of the machine shown in FIG. 1 and illustrating the power-actuated device for actuating the leg-shifting means.

The machine which forms the subject of the present invention is broadly denoted by the numeral 20 and includes a support 22 in the nature of a hollow housing 24 having a bottom wall 26, a top wall 28, a pair of side walls 30, and a pair of end walls 32. Housing 24 is adapted to be mounted on a plurality of upstanding legs 34 disposed on a surface 36 such as a floor, so that the top wall 28 of housing 24 is in a substantially horizontal position.

Top wall 28 is provided with an opening intermediate side walls 30 and proximal to one of the end walls 32 for receiving an elongated, channel-shaped structure 38 extending into housing 24 and projecting above top wall 28. The longitudinal axis of channel-shaped structure 38 is inclined relative to the vertical, and the sides 40 and 42 of structure 38 extend outwardly from the central plate-like portion 44 in a direction toward the proximal end wall 32. A portion 46 of structure 38 rests on and is supported by the proximal end wall 32, and the lower end 48 of structure 38 rests on and is supported by bottom wall 26. Suitable fastening means secure end 48 to bottom wall 26 so as to rigidly secure structure 38 to housing 24.

Sides 40 and 42 of structure 38 are each provided with an elongated slot 50 therein extending longitudinally thereof and substantially parallel with the longitudinal axis of structure 38. Slots 50 each receive a pair of vertically spaced pins 52 which are carried by the flanges 54 of an elongated plate 56 for guiding plate 56 as the latter shifts along a path substantially parallel to the longitudinal axis of structure 38. As is shown in FIG. 2, plate 56 is spaced outwardly from the plate-like portion 44 of structure 38 for movement relative thereto from a position spaced above wall 28 to a position adjacent the latter.

Portion 44 of structure 38 is provided with a pair of horizontally-spaced pins 58 therein projecting outwardly therefrom toward the center of top wall 28. Pins 58 are received in elongated slots 60 disposed in a plate-like component 62 so as to guide component 62 along a substantially vertical path parallel to the longitudinal axis of structure 38. Component 62 thereby shifts from a position spaced above top wall 28 to a position adjacent the latter.

A pair of ribs 64 are disposed on the outer face of component 62 and converge toward each other as the lowermost edge 55 is approached. A projection 68 is secured to the outer face of component 62 and extends outwardly therefrom proximal to lower edge 66. Projection 68 moves downwardly as component 62 is moved downwardly. Component 62 is disposed on structure 38 between portion 44 and plate 56.

A power-actuated device 70 in the nature of a cylinder and piston unit, is mounted on portion 44 by means of a block 72 extending outwardly from an opening 74 in portion 44 adjacent the upper end of the latter. The piston of device 70 is secured rigidly to the upper end of component 62 for shifting the same along a substantially vertical path toward and away from top wall 28. Suitable fluid conduits 76 adapted to be operably coupled to a source of fluid, supply the cylinder of device 70 for shifting the piston thereof.

Power-actuated means 78 in the nature of a cylinder and piston unit is mounted on the outer face of portion 44 between the sides 42 of structure 38 for shifting the flanges 54, and thereby plate 56 along a substantially vertical path toward and away from top wall 28. The piston rod 80 of power means 78 is connected to flanges 54 through a crossbar 82 mounting a pair of elongated stretches 84 which are surrounded by coil springs 86. The ends of stretches 84 opposite to the ends secured to crossbar 82 are freely shiftable within openings in opposed lugs 88 which are rigid to flanges 54, by means of pins 52. As fluid is caused to enter the cylinder of power means 78 through the conduit lines 90 and 92 thereof, piston rod 80 is caused to move into and out of the cylinder. As the piston rod 80 moves into the cylinder, plate 56 is moved downwardly toward top wall 28. Conversely, as piston rod 80 is moved out of the cylinder, plate 56 is moved away from top wall 28. Springs 86 are provided on crossbar 82 so as to prevent the "bottoming out" of piston rod 80 and thereby prevent damage to machine 20 and the bird disposed on the latter.

Plate 56 is provided with a lowermost arcuate edge 94 which is positioned above projection 68 when plate 56 is in the normal position shown in FIGS. 1 and 2. As plate 56 moves toward top wall 28, the arcuate edge 94 moves downwardly therewith to a position adjacent top wall 28.

Mounted on structure 38 within housing 24 is an elongated first length 96 of rigid material, length 96 being secured to the portion 44 of structure 38 at one side edge 98 in any suitable manner such as by welding. An elongated second length 100 is secured to portion 44 and vertically spaced below length 96, lengths 96 and 100 extending in the same direction and secured to structure 38 in the same manner.

Secured to the upper face of length 96 is a pair of upright stretches 102 and 104, the latter extending to a position adjacent top wall 28, and a flat plate-like element 106 interconnects the upper ends of stretches 102 and 104.

Each of stretches 102 and 104 is provided with an elongated groove 108 therein for guiding a pin 110 illustrated in FIG. 1, which projects in a direction which is substantially perpendicular to the inner faces of stretches 102 and 104. Pin 110 is carried by a V-shaped device 112 having outer ends 114 and 116 secured to a pair of elongated needles 118 and 120. Needles 118 and 120 are disposed within a pair of elongated sleeves 122 and 124 secured to lengths 96 and 100 with the longitudinal axes of sleeves 122 and 124 being inclined relative to the longitudinal axis of structure 38. Further, the longitudinal axes of sleeves 122 and 124 converge as top wall 28 is approached. Thus, needles 118 and 120 cross at a point proximal to a point directly beneath element 106.

Power-actuated apparatus 126, in the nature of a cylinder and piston unit, is secured at one end thereof to length 100 and passes through an opening centrally disposed in length 96. The piston of apparatus 126 is operably coupled to the device 112 for shifting the latter toward and away from top wall 28 by virtue of fluid entering conduits 128 and 130 of the cylinder of the apparatus 126.

Figure 12:
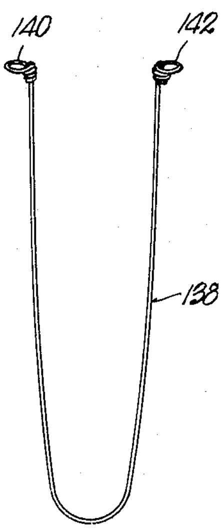
FIG. 12 is an enlarged view of the wire as it is disposed for insertion into the machine for looping around the legs and tail of the bird to be tied.

Element 106, mounted on the upper ends of stretches 102 and 104, is provided with a pair of spaced openings which permit needles 118 and 120 to pass through, and top wall 28 is provided with a pair of spaced openings 132 and 134 for permitting needles 118 and 120 to pass through top wall 28 and project outwardly from the latter. It is evident, that since needles 118 and 120 cross at a point directly below element 106, needle 118 passes outwardly through opening 132 and needle 120 passes through opening 134 when device 112 is shifted upwardly under the influence of power-actuated apparatus 126. As the piston rod is retracted into the cylinder of apparatus 126, needles 118 and 120 move downwardly into the respective sleeves 122 and 124. A slot 136 is disposed between openings 132 and 134 in top wall 28 for receiving an elongated, initially U-shaped wire 138 having looped ends 140 and 142, and illustrated in FIG. 12. Wire 138 is permitted to pass into housing 24 through slot 136, and since the upper ends of needles 118 and 120 are disposed directly below element 106 when the needles are in an inoperative position, the looped ends 140 and 142 of wire 138 overlie openings 132 and 134 respectively, so that when the needles are caused to pass through these openings, the ends of the needles, which are conical in cross section, pass into the looped ends 140 and 142 of wire 138 to thereby carry the wire upwardly therewith.

Figure 3:
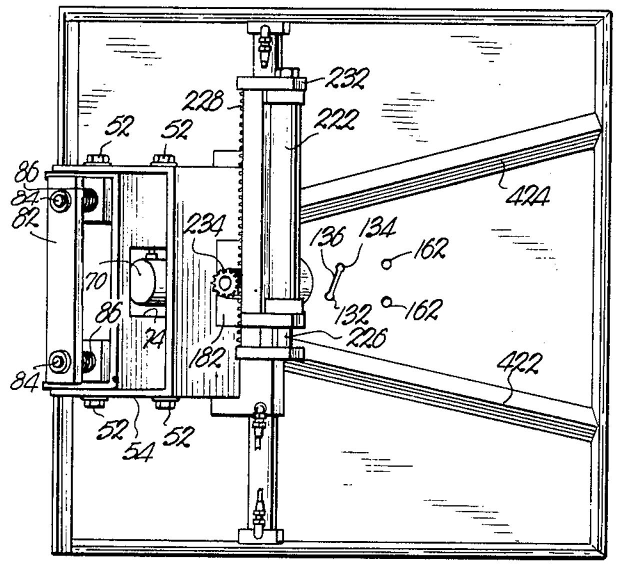
FIG. 3 is a plan view of the machine illustrated in FIGS. 1 and 2.

Secured to the outer face of stretch 104 is a U-shaped guide member 144 having a pair of sides 146 and 148 respectively, and a bight portion 150 interconnecting sides 146 and 148. Power-actuated mechanism 152 in the nature of a piston and cylinder unit is secured to the outer face of stretch 104, and the piston rod passes through the bight portion 150 and is operably coupled to a block 154 having end projections 156 carried within substantially vertically disposed slots 158 on the inner faces of sides 146 and 148. Block 154 is therefore, shiftable relative to guide member 144 under the influence of power-actuated mechanism 152 to shift a pair of horizontally-spaced, sharpened probes 160. Top wall 28 is provided with a pair of spaced apertures 162, as illustrated in FIG. 3, as being spaced from openings 132 and 134, and probes 160 pass through apertures 162 as block 154 is shifted upwardly under the influence of mechanism 152. Conduits 164 and 166 operably couple the cylinder of mechanism 152 to a source of fluid under pressure for actuating the piston for shifting block 154.

As illustrated in FIGS. 5, 6 and 7, a pair of elongated, vertically-spaced track members 168 and 170 are secured to the outer face of plate 56 and project outwardly therefrom. Members 168 and 170 are provided with central openings 172 and 174 respectively, for clearing one end 176 of an elongated shaft 178 rotatably mounted on the outer face of plate 56 by means of a pair of vertically-spaced bearing blocks 180 and 182.

Shaft 178 rotates about an axis which is substantially parallel to the longitudinal axis of structure 38 and has an enlarged bulge 184 having radially extending projections 186 thereon. Projections 186 extend into the region between members 168 and 170 and rotate with shaft 178. An elongated plate 188 interconnects the outermost edges of members 168 and 170. Disposed between members 168 and 170 on opposed sides of shaft 178, is a pair of die members 190 which are movable toward and away from shaft 178 by being interconnected to power-actuated means broadly denoted by the numeral 192 and comprising a cylinder 194 and a piston rod 196.

Each die member 190 is provided with an arcuate groove 198 therein for clearing projections 186 as shaft 178 rotates and die members 190 are positioned adjacent the latter. Each die member 190 is provided with a substantially concave surface 200 on the innermost face 202 thereof for complementally receiving the bulge 184 of shaft 178 when the die members are moved to a position proximal to the latter. Cylinders 194 are adapted to be operably coupled to a suitable source of fluid under pressure so that upon actuation, the piston rods 196 force the die members 190 to a position adjacent shaft 178 where the projections 186 are positioned within grooves 198.

A pair of gates 204 and 206 are hingedly interconnected with the bearing block 180 and an outwardly projecting bracket 208 extending from each flange 54 at each side of plate 56. A pair of elongated pins 210 swingably mount each pair of gates 204 and 206 so that the same rotate about axes substantially prependicular to the axis of rotation of shaft 178.

A coil spring 212 interconnects each pair of gates 204 and 206 so that the lowermost, upwardly directed, converging ends 214 and 216 respectively, are in a position closing the gap between gates 204 and 206. Gates 204 and 206 are swung to an open position when needles 118 and 120 pass therebetween carrying wire 138. As needles 118 and 120 retract into housing 24, the looped ends 140 and 142 are caught by the upwardly directed, converging ends 214 and 216 of gates 204 and 206 so as to maintain the ends of the wire on opposed sides of shaft 178. Thereupon, as die members 190 move toward shaft 178, the ends of the wire are brought into substantial engagement with shaft 178 proximal to projections 186 thereon. As shaft 178 rotates while wire 138 is in this position, projections 186 engage the wire 138 at the ends thereof to twist the ends together.

Disposed on the upper bearing block 182 is a stationary block 218 by means of an elongated screw 220 and block 218 mounts a power-actuated device 222 in the nature of a cylinder 224 having a shiftable piston therein provided with a piston rod 226 extending through and outwardly from block 218. Rod 226 is secured to an elongated rack 228 shiftable within a groove 230 in block 218, and a similar block 232 at the opposite end of cylinder 224, and is illustrated in FIG. 1. Rack 228 is in substantial mesh with a pinion 234 having a hub 236 rigidly secured to the upper end of shaft 178 on the upper side of bearing block 182. As piston rod 226 moves outwardly from block 218, rack 228 causes pinion 234, and thereby shaft 178, to rotate in a clockwise sense when viewing FIG. 7. Thus, the projections 186 are caused to rotate and to carry therewith the ends of the wire disposed adjacent thereto.

In FIG. 13, the schematic wiring diagram for the electrical components of machine 20, is illustrated, and further, a schematic diagram of the pneumatic interconnections with valve structure and the various power-actuated devices, is also illustrated.

Means for actuating the various power-actuated devices includes a plurality of solenoid actuated valves broadly denoted by the numerals 238, 240, 242, 244 and 246. Each of the aforesaid valves controls the flow of air to the respective device from a line 248 which is adapted to be operably coupled to a source of air under pressure.

As illustrated in FIG. 8, a valve of the aforesaid type is illustrated, valve 238 being taken as an example, and valves 240 to 246 inclusive are substantially identical with valve 238 and, therefore, need not be described.

Valve 238 is provided with a body 250 having a fluid inlet 252 and a pair of fluid outlets 254 and 256. A valve element 258 in the nature of an elongated rod, is provided with a pair of lands 260 and 262 which are adapted to engage O-ring seals 264 for sealing the respective outlet from the inlet 252. As the element 258 shifts to a position illustrated in FIG. 8, land 260 moves out of engagement with the O-ring seal 264 adjacent inlet 252 to permit fluid to pass through the latter and out of outlet 254. It is to be noted that land 262 is maintained in engagement with the O-ring seal 264 thereof adjacent inlet 252 to thus preclude the flow of fluid through outlet 256. Conversely, as element 258 is moved in the direction opposite to that shown in FIG. 8, land 260 is positioned to prevent the flow of fluid to outlet 254, and land 262 is moved to permit the flow of fluid through outlet 256.

Means is provided for shifting element 258 responsive to an electrical signal, and comprises solenoids 266 and 267 at opposed ends of body 250. Only solenoid 266 is illustrated in FIG. 8 since both solenoids 266 and 267 for each valve 238 to 246 inclusive, are identical.

A cylinder 268 is secured to the corresponding end of body 250 and extends axially thereof. A coupler 270 interconnects the corresponding end of element 258 with the rod 272 of a piston 274 slidable within cylinder 268 toward and away from body 250. An O-ring seal 276 surrounds piston 274 and engages the inner wall of cylinder 268. A coil spring 278 is disposed within cylinder 268 and surrounds rod 272 to bias piston 274 in a direction away from body 250. Since the springs 278 on opposed sides of body 250 are substantially identical, the bias on element 258 is such as to dispose element 258 in a neutral position with the lands 260 and 262 positioned to prevent the flow of fluid from inlet 252 through outlets 254 and 256 respectively.

Solenoid 266 is supported by clinder 268 and includes an electrically conducting coil 280 adapted to be coupled to a source of electrical power. A grooved core 282 is disposed coaxially of coil 280 and is surrounded by a coil spring 284 which biases the core 282 in a downward position as illustrated in FIG. 8. Core 282 is provided with a plurality of circumferentially spaced, longitudinally extending grooves 286 in the outer surface thereof and is further provided with depressions 288 and 290 in the upper and lower ends thereof. Solenoid 266 is provided with a cap 292 in covering relationship to the bore 294 within which core 282 is disposed. Cap 292 is provided with a fluid passage 296 therethrough and a projection 298 receivable in the depression 288, the latter therefore, serving as a valve seat for closing off fluid passage 296.

The structure 300 coupling solenoid 266 with cylinder 268, is provided with a first fluid passage 302 therein which receives a source of fluid under pressure from conduit 304 connected thereto. Fluid passage 302 opens into a chamber 306 by passing through a projection 308. Chamber 306 is in fluid communication with a chamber 310 adjacent the piston 274 and within cylinder 268 by virtue of a fluid passage 312. Depression 290 receives projection 308 when core 282 is shifted downwardly under the influence of coil spring 284. Thus, in the normal or de-energized condition, core 282 is in a position wherein projection 308 is received within depression 290, the latter closing off fluid passage 302 to prevent the flow of air from conduit 304 to chamber 310. In the deenergized condition, chamber 310, fluid passage 312 and chamber 306, communicate with fluid passage 296 by virtue of grooves 286.

When it is desired to shift pistons 274 to permit the flow of fluid through inlet 254 and through outlet 256, solenoid 266 is energized to force core 282 upwardly into closing relationship with fluid passage 296. Thereupon, the fluid passage 302 is placed in fluid communication with chambers 306 and 310. Piston 274 is then moved in a direction to compress coil spring 278 and to force element 258 to move to thereby place inlet 252 into fluid communication with outlet 256.

Similarly, if it is desired to place inlet 252 in fluid communication with outlet 254, air is supplied to the chamber adjacent the piston in the cylinder 268 on the opposite side of body 250 so as to force element 258 in the opposite direction. Thereupon, land 260 is moved to a position illustrated in FIG. 8 to place inlet 252 in fluid communication with outlet 254.

Exhaust ports 314 are provided for cylinders 268 so as to permit the flow of air outwardly from the devices connected with the outlets 254 and 256 respectively, when the lands 260 and 262 are moved out of engagement with the outermost O-ring seals 264. As illustrated in FIG. 8, outlet 256 is in fluid communication with exhaust port 314 in the corresponding cylinder 268. By moving element 258 to the right, as viewed in FIG. 8, land 260 may be moved out of engagement with the outermost O-ring seal 264 to place outlet 254 in fluid communication with the exhaust port 314 of the corresponding cylinder 268.

As illustrated in FIG. 13, each of the valves 238 to 264 inclusive, is provided with a pair of opposed solenoids 266 and 267, together with the associated cylinders 268 for actuating the elements 258 of the valves. The conduit 304 is illustrated above line 248 and is shown by dashed lines to be operably coupled with the solenoids 266 for supplying air to the respective chambers 310.

The outlets 254 and 256 of valve 238, are connected to pipes 316 and 318 through flow regulators 320. Conduits 76 of power device 70 are interconnected to pipes 316 and 318 respectively, so that the piston within the device 70 may be shifted in one of a pair of opposed directions. Component 62 is shown schemtaically in FIG. 13 as being connected to the piston rod of device 70. Pipes 316 and 318 are operably coupled with enclosed, pneumatically-actuated pressures switches 322 and 324 which are in the normally closed position, but are actuated to the normally open position when the pressures within the enclosures containing the switches, are increased to a predetermined value responsive to the air pressures in the respective pipes 316 and 318.

Valve 240 is connected through pipes 326 and 328 to power apparatus 126, through conduits 128 and 130. The needles 118 and 120 are shown schematically coupled to the apparatus 126. Pipes 326 and 328 are each provided with a flow regulator 320 therein and are operably coupled with enclosed, pneumatically actuated pressure switches 330 and 332. It is to be noted that the pressure switches remain in the normally closed position as shown in FIG. 13 so long as the pressures in the corresponding pipes are below a predetermined value. As soon as the pressures reach the predetermined value, the switches are thrown to the normally open position.

Valve 242 is shown connected to a pair of pipes 334 and 336 through regulators 320, and power means 78 and power mechanism 152, are operably coupled to pipes 334 and 336 through the conduits 90 and 92 and conduits 164 and 166. Plate 56 and probes 160 are shown schematically in FIG. 13 as being operably coupled to the means 78 and apparatus 152 respectively. Pipes 334 and 336 are operably coupled with enclosed, pneumatically-actuated pressure switches 338 and 340 also normally disposed in the closed position when the pressures in pipes 334 and 336 are below a predetermined value.

Valve 244 is shown connected with pipes 342 and 344 through regulators 320, and pipes 342 and 344 are operably coupled with power means 192 operably coupled schematically with die members 190. Pipes 342 and 344 are operably coupled with enclosed, pneumatically-actuated pressure switches 346 and 348, the latter in the normally closed position as shown in FIG. 13, so long as the pressure in pipes 342 and 344 is below a predetermined value.

Valve 246 is operably coupled to pipes 350 and 352 through regulators 320, and power device 222 is operably conpled to pipes 350 and 352 by virtue of the conduits associated therewith. The rack 228 is shown schematically in operable relationship with power device 222. Pipe 350 is operably coupled to a pneumatically-actuated pressure switch 354 and the end of pipe 352 opposite to the end connected to valve 346, is closed.

Electrical power is supplied to the solenoids 266 and 267 and the aforementioned pressure-actuated switches by connecting a pair of terminals 356 and 358 to a source of electrical power. Terminal 356 is connected to one side of each of the solenoids 266 and 267 by virtue of a lead 360 connected to leads 362, 364, 366, 368 and 370.

A switch 372, shown in FIG. 13 in the normally closed position, is interposed in the line containing terminal 358 and is adapted to be actuated by the foot or knee of the operator of machine 20 so as to place lead 374 in electrical contact with terminal 358. When switch 372 is actuated to accomplish this, switch 348 and switch 340, are connected to terminal 358 through leads 376, 378 and 380. Further, lead 382 interconnects solenoids 266 of valve 238 with lead 378. A lead 384 interconnects switch 332 with lead 382. A lead 386 interconnects switch 324 with the solenoid 266 of valve 240. A lead 388 connects switch 332 to the solenoid 266 of valve 242. A lead 390 interconnects switch 338 with solenoid 267 of valve 238. A lead 392 interconnects switches 330 and 340 with solenoid 267, a lead 394 being connected to lead 392 and to one pole of an emergency switch 396 which is normally open. The opposite pole is connected to switch 372 by a lead 398. Switch 330 is operably coupled to switch 396 by a lead 400 and is further connected to solenoid 266 of valve 244 through lead 402. Switch 396 is in a position to normally connect leads 400 and 402. Switches 324 and 340 are interconnected with lead 404, and switches 322 and 354 are interconnected by lead 406. Switch 322 is further connected to switches 338, 346 and solenoid 267 of valve 244 by virtue of leads 408, 410 and 412. A lead 424 interconnects switch 346 with solenoid 267 of valve 242 and lead 416 interconnects switch 348 with solenoid 266 of valve 246. Switch 354 is connected to solenoid 267 of valve 246 by lead 418.

*Operation*

To place machine 20 in operation, the operator thereof positions an eviscerated bird, shown in dashed lines in FIG. 2 and broadly denoted by the numeral 420, on the upper surface of top wall 28 as shown in FIG. 2. The bird is positioned between a pair of upstanding ribs 422 and 424 which extend from one end wall 32 toward the opposite end wall 32 and terminating adjacent structure 38. The ribs 422 and 424 converge as structure 38 is approached. In the initial position, the legs 426 are in an upwardly extending position and substantially adjacent to the edge 94 of plate 56. The tail 428 of bird 420 is positioned adjacent structure 38 and below projection 68.

In operating machine 20, the operator thereof actuates switch 372 to place lead 374 in electrical contact with terminal 358, the terminals 356 and 358 having been operably coupled to a source of electrical power. Thereupon, power is supplied to switch 348, switch 340, switch 332, and solenoid 266 of valve 238. As solenoid 266 of valve 238 is actuated, the core 282 of the respective solenoid 266 is shifted to place conduit 304 in fluid communication with the chamber 310 of the corresponding cylinder 268. Thus, the element 258 of valve 238 is shifted to supply air from line 248 to the pipe 318 associated therewith. Thereupon, air flows through the corresponding conduit 76 into the power device 70 to shift component 62 to force the latter downwardly toward top wall 28. Projection 68 then is moved into clamping relationship against tail 428, forcing the latter into engagement with the upper surface of top wall 28 as illustrated in FIG. 9.

As pipe 318 is supplied with air from valve 238, the pressure within switch 324 builds up to a predetermined value, and when such value is attained, the shiftable pole of switch 324 shifts to the normally closed position and places lead 386 in electrical contact with lead 404. Thereupon, power is supplied to solenoid 266 of valve 240, through lead 404, switch 340, lead 380, lead 378 and lead 374. As solenoid 266 of valve 240 is energized, air is supplied from line 248 to pipe 328 to actuate the apparatus 126, thus forcing needles 118 and 120 upwardly. As needles 118 and 120 move upwardly, the same pass through the portion of bird 420 adjacent tail 428 thereof and carry therewith wire 138. The ends 140 and 142 of wire 138 are carried upwardly and pass between gates 204 and 206 under the influence of needles 118 and 120. Wire 138 is, therefore, looped around tail 428 and legs 426 as the needles 118 and 120 move on opposed sides of the latter.

Figure 10:
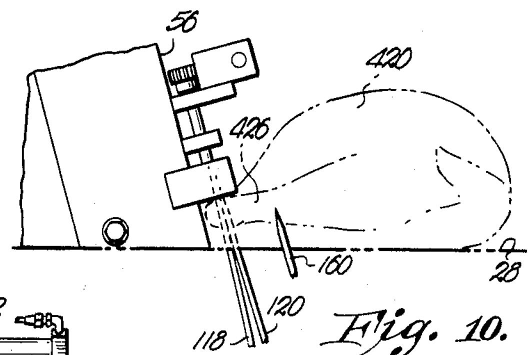
FIG. 10 is a view showing the probes inserted in the bird and the needles passing through the tail of the latter prior to the twisting of the ends of the wire for securing the legs to the tail.

As air is supplied to pipe 328, the pressure within switch 332 is increased to the aforesaid predetermined value to cause the shiftable pole thereof to move to the normally closed position, placing lead 388 in electrical contact with lead 384. When this occurs, power is supplied to solenoid 266 of valve 242, through lead 388, switch 332, lead 384 and lead 374. Thereupon, air is supplied to one side of power means 78 and to one side of power mechanism 152 to simultaneously force plate 56 toward top wall 28 and to force the probes 160 into bird 42 disposed thereabove. As plate 56 moves toward top wall 28, the legs 426 are moved to a location adjacent tail 428 by virtue of the ribs 64, directing the leg 426 to said location. The position of the bird 420 is shown in FIG. 10 with the legs 426 thereof in the location adjacent the tail 428. A probe 160 is illustrated in FIG. 10 as passing into the back of the bird 420 to hold the latter in a fixed position. The needles 118 and 120 are shown in the extended position adjacent top wall 28 and the lower edge of plate 56 is shown adjacent top wall 28.

As air is supplied to pipe 336, the switch 340 is also supplied with air and when the pressure within the switch 340 increases to the aforesaid predetermined value, the shiftable pole of switch 340 is moved to the normally closed position, placing lead 380 in electrical contact with lead 392. When this occurs, lead 380 is moved out of electrical contact with lead 404 and, therefore, the solenoid 266 of valve 240 is de-energized by virtue of the interruption of the circuit containing lead 386, switch 324, lead 404 and lead 380. When this occurs, the core 282 of solenoid 266 of valve 240, shifts to a position closing the fluid passage 302 and permits the chamber 310 to be placed in fluid communication with the fluid passage 296 through the corresponding grooves 286 of the core. The corresponding coil spring 278 then shifts the element 258 to the neutral position.

Simultaneously therewith, solenoid 267 of valve 240 is energized by virtue of the interconnection of lead 392, switch 340, leads 380, 378 and 374. When this occurs, the element 258 of valve 240 shifts in the opposite direction shown to admit air into pipe 326 and thence to apparatus 126 through conduit 128 to shift needles 118 and 120 in the opposite direction. Needles 118 and 120 therefore, retract into housing 24 leaving the wire 138 which was originally moved around the tail and legs, in an upwardly extending position by virtue of the ends 140 and 142 of the wire 138 being held by the gates 204 and 206.

Switch 330 is connected to lead 374 through lead 392, switch 340, leads 380 and 378. Thus, when air is supplied to pipe 326, the pressure within switch 330 builds up to the aforesaid value and thereupon, the shiftable pole of switch 330 moves to the normally closed position, thus placing lead 400, switch 396, lead 402 and solenoid 266 of valve 244 in electrical contact with lead 374.

Thus, the last-mentioned solenoid 266 is energized to supply air to pipe 344 and thereby power means 192 operably connected to each of the die members 190. The die members therefore, move toward shaft 178 and carry therewith the ends of wire 138. The ends are therefore, forced into engagement with shaft 178 and substantially engage the projections 186 on the latter.

As air is supplied to pipe 344, the pressure within switch 348 is increased to the aforesaid value, thus causing the shiftable pole of switch 348 to the normally closed position, placing lead 416 in electrical contact with lead 374 through lead 376. As this occurs, solenoid 266 of valve 246 is energized to supply air to pipe 352 and thereby, to power means 222 to force rack 228 in one direction. Rack 228 thereby rotates pinion 234 and thus rotates shaft 178 about the longitudinal axis thereof. Projections 186 of shaft 178 thereby engage the ends of the wire 138 to twist the ends together about the legs and tail of bird 420. The operator, upon viewing the movement of rack 228 to a position twisting the ends of wire 138, releases switch 372 to interrupt the connection between terminal 358 and lead 374. Thereupon, lead 398 is placed in electrical contact with terminal 358 and thereby places switch 322 in contact with terminal 358.

Further, solenoid 267 of valve 244 is energized by virtue of the interconnection thereof with leads 410 and 412 through switch 322. As solenoid 267 of valve 244 is actuated, air is supplied to pipe 342 and thereby to the opposite ends of power means 192 on each side of plate 56. Die members 190 then move outwardly in opposed directions from shaft 178 to the normal or inoperative position. The pressure within switch 346 increases to the aforesaid predetermined value, and upon attaining this value, the shiftable pole of switch 346 moves to the normally closed position to energize solenoid 267 of valve 242 through lead 414, lead 410, lead 408, switch 322 and lead 398. Immediately thereupon, air is supplied to the pipe 334 to actuate power means 78 and power mechanism 152 to force plate 56 upwardly and probes 160 downwardly respectively.

It is to be noted at this juncture, that the solenoids 266 of valves 242 and 244 have been previously deenergized by virtue of the removal of air from the interior of switches 330 and 332. This has occurred by interrupting the circuit, including leads 374, 378, 380, 382, 384 and 392. Thus, it is evident that the solenoids 267 of valves 242 and 244 are capable of shifting the respective elements 258 with no operation from the corresponding solenoids 266.

As pipe 334 is supplied with air, switch 338 is supplied with air to the predetermined value, whereupon the switch is actuated to the normally closed position to thus energize solenoid 267 of valve 238 through lead 290.

As this occurs, air is supplied to pipe 316 and thereby to power device 70 to force component 62 upwardly and away from top wall 28. Simultaneously therewith, air is supplied to the interior of switch 322 and the pressure therein builds up to the aforesaid predetermined value. As soon as this value is attained, the shiftable pole of switch 332 is shifted to the normally closed position to thereby place lead 406 in electrical contact with lead 398 to thereby place switch 354 and lead 418 in contact with lead 398. Thereupon, solenoid 267 is actuated to supply air to pipe 350 and thus shift rack 228 to the inoperative position with piston rod 226 within cylinder 224. Switch 354, by virtue of being coupled with pipe 350, receives air, and when the aforesaid predetermined value is attained, the switch is thrown to the normally closed position thus interrupting the circuit to solenoid 267.

As switch 322 is actuated to the normally closed position, the solenoids 267 of valves 238 and 242 are deenergized to thus remove the air from the interiors of switches 322 and 338.

When switch 354 is moved to the normally closed position, the operation is complete and the bird, in the tied position illustrated in FIG. 11, is removed from top wall 28 and another bird 420 is placed in position for the tying operation. It is to be noted that, after the bird is tied, the operator of machine 20 may bend the twisted portion of the wire toward the bird, so that the bird will be in condition for packaging.

As shown in FIG. 11, the legs 426 of bird 420 are shown in a crouched or hunched position when the legs 426 are tied by wire 138. Initially, when bird 420 is disposed on the top wall 28 of housing 24, the legs 426 extend upwardly and substantially rearwardly of the main portion of the body of bird 420. This is illustrated in FIGS. 2 and 9.

In the aforementioned initial position, the ends of the legs are in substantial contact with the outer surface of component 62. As component 62 shifts downwardly toward top wall 28 to force projection 68 into engagement with tail 428 of bird 420, the ends of the legs 426 remain stationary and slide over the outer surface of component 62 and remain between the ribs 64 of the latter. Thereupon, component 62 becomes substantially stationary and serves as an abutment to legs 426 to shift the latter forwardly of the body of the bird as the same are shifted downwardly under the influence of edge 94 of plate 56.

As plate 56 is shifted downwardly responsive to the actuation of power means 78, edge 94 engages legs 426 at points thereon spaced from the outermost ends thereof and force the legs 426 toward top wall 28. When this occurs, the ends of legs 426 slide over the outer surface of component 62 and are directed toward each other by virtue of being in engagement with ribs 64 which serve as guides for legs 426 and which extend outwardly from component 62 and substantially span the distance between the latter and the inner surface of plate 56.

Each leg 426, provided with a stifle joint 430 and a thigh joint 432 (FIGS. 2 and 9), moves forwardly of bird 420 and bend about the stifle and thigh joints 430 and 432 respectively. The forward movement of legs 426 is obtained by the construction of component 62 since the latter is inclined relative to top wall 28, extending above the latter and away from the position assumed by bird 420 thereon.

As leg 426 moves forwardly as the same moves downwardly, stifle joint 430 of each leg 426, moves forwardly and into hunched relationship with the side of bird 420 and the wing 434 thereof. Thus, the outermost stretch 436, the stifle joint 430 and the innermost stretch 438 of each leg 426, rotate about the corresponding thigh joint 432 to the position illustrated in FIG. 10. Thereupon, the wire is looped around the legs and tail of bird 420 and the ends of the wire are secured together to thereby truss the bird in the condition shown in FIG. 11.

Since ribs 64 are convergent as projection 68 is approached, legs 426 move toward each other as the same move downwardly under the influence of the downward movement of plate 56. Bird 420 is prevented from moving out of a fixed position on top wall 28 by virtue of projection 68 being in clamped relationship to tail 428 and by virtue of probes 160 being inserted into the back of bird 420.

Having thus described the invention, what is claimed as new and desired to be secured by Letters Patent is:

1. A machine for tying the legs of a carcass comprising means adapted for supporting the carcass with the legs thereof in an outstretched condition; means adjacent to said supporting means for clamping a portion of the carcass thereto; means adjacent said supporting means disposed to engage said outstretched legs and shift the same to a location in proximal relationship; and means for looping an elongated securing member around the legs while the latter are in said location and for interconnecting opposed ends of the securing member.

2. A machine for tying the legs of an eviscerated bird to the tail thereof with an elongated wire, said machine comprising means adapted for supporting the bird in a position with the legs thereof in an outstretched condition; means adjacent said supporting means for shifting the legs of said bird to a location adjacent the tail thereof; means adjacent said supporting means and movable into and out of engagement with said bird to releasably hold the same in said position as said legs are moved to said location; means for looping said wire around the legs and tail of the bird when said legs are at said location; means for removing said wire from said looping means when said wire is looped around said legs and said tail; and means adjacent said removing means for securing the ends of the wire together to secure said legs to said tail.

3. A machine for tying the legs of an eviscerated bird to the tail thereof with an elongated wire, said machine comprising means adapted for supporting said bird on the back thereof with the legs thereof in an upwardly extending condition; means adjacent said supporting means for shifting the legs of said bird to a location adjacent the tail thereof; means movable into said bird at the back thereof for maintaining the bird in a fixed position on said supporting means as said legs are moved to said location; means for looping said wire around the legs and tail of the bird when said legs are at said location; and means adjacent said looping means for securing the ends of the wire together to secure said legs to said tail.

4. A machine for tying the legs of an eviscerated bird to the tail thereof with an elongated wire, said machine comprising means adapted for supporting said bird on the back thereof with the legs thereof in an upwardly extending condition; means adjacent said supporting means for shifting the legs of said bird to a location adjacent the tail thereof; means adjacent said shifting means and adapted to engage the bird at said tail thereof for clamping said tail to said supporting means to thereby maintain said bird in a fixed position relative to the latter as said legs are shifted to said location; means for looping said wire around the legs and tail of the bird when said legs are at said location; and means adjacent said looping means for securing the ends of the wire together to secure said legs to said tail.

5. A machine for tying the legs of an eviscerated bird to the tail thereof with an elongated wire, said machine comprising means adapted for supporting said bird on the back thereof with the legs thereof in an upwardly extending condition; means adjacent said supporting means for shifting the legs of said bird to a location adjacent the tail thereof; means adjacent said shifting means and adapted to engage the bird at said tail thereof for clamping said tail to said supporting means to maintain said tail in a fixed position relative to the latter as said legs are shifted to said location; means adapted to engage the bird at said back thereof for preventing movement of said bird relative to said tail and said supporting means when said tail is clamped and said legs are moved to said location; means for looping said wire around the legs and tail of the bird when said legs are at said location; and means adjacent said looping means for securing the ends of said wire together to secure said legs to said tail.

6. A machine for tying the legs of an eviscerated bird to the tail thereof with an elongated wire, said machine comprising a support having an upper surface provided with an opening therein and an aperture therethrough spaced from said opening, said bird adapted to be disposed on said surface and supported thereby with the legs of the bird in an upwardly extending condition and the tail thereof adjacent said opening; means shiftably mounted on said support above said surface for shifting said legs downwardly to a location adjacent said tail; means shiftably mounted on said support below said surface for movement through said aperture into engagement with the bird for maintaining the latter in a fixed position on said surface as said legs are moved to said location; means shiftably mounted on said support below said surface for movement through said opening and adapted to engage said wire for looping the latter around the legs and tail of the bird as said looping means moves through said opening; and means for securing the ends of the wire together to secure said legs to said tail.

7. A machine for tying the legs of an eviscerated bird to the tail thereof with an elongated wire, said machine comprising a support having an upper surface provided with a pair of spaced openings therein and an aperture therethrough spaced from said opening, said bird adapted to be disposed on said surface and supported thereby with the legs of the bird in an upwardly extending condition and the tail thereof between said openings; means shiftably mounted on said support above said surface for shifting said legs downwardly to a location adjacent said tail; means shiftably mounted on said support below said surface for movement through said aperture into engagement with the bird for maintaining the latter in a fixed position on said surface as said legs are moved to said location; means shiftably mounted on said support below said surface for movement through said openings and adapted to engage said wire for looping the latter around the legs and tail of the bird as said looping means moves through said openings; and means carried by said leg shifting means and adapted for engaging the ends of the wire for twisting said ends to secure said legs to said tail.

8. In a machine as set forth in claim 7, wherein is included elongated structure secured to said support and extending above said surface, said leg shifting means including a plate mounted on said structure for movement toward and away from said surface and power actuated means secured to said support and said plate for shifting the latter.

9. In a machine as set forth in claim 8, wherein said plate is provided with an edge engageable with said legs for moving the latter downwardly to said location.

10. An apparatus for handling a carcass having a pair of legs:

structure having a top for supporting the carcass with its legs outstretched and spaced apart;

means engageable with the carcass for holding the latter against movement in one direction on said top;

movable mechanism engageable with said legs for swinging the latter downwardly toward said top; and means engaging the outermost ends of the legs and disposed to shift the legs in the opposite direction as they swing downwardly.

References Cited by the Examiner

UNITED STATES PATENTS

| | | | |
|---|---|---|---|
| 1,642,850 | 9/27 | Foulder | 140—93 |
| 1,821,506 | 9/31 | Foulder | 140—93 |
| 1,929,929 | 10/33 | Monopoli | 24—27 |
| 2,560,067 | 7/51 | Bell | 17—11 |
| 2,722,712 | 11/55 | Rabe | 17—11 |
| 3,082,475 | 3/63 | Belknap | 17—11 |

SAMUEL KOREN, *Primary Examiner.*

LUCIE H. LAUDENSLAGER, *Examiner.*